(12) United States Patent
Hatman

(10) Patent No.: US 8,201,621 B2
(45) Date of Patent: Jun. 19, 2012

(54) HEAT EXCHANGING HOLLOW PASSAGES WITH HELICOIDAL GROOVES

(75) Inventor: Anca Hatman, Easley, SC (US)

(73) Assignee: General Electric Company, Schenectady, NY (US)

( * ) Notice: Subject to any disclaimer, the term of this patent is extended or adjusted under 35 U.S.C. 154(b) by 669 days.

(21) Appl. No.: 12/330,007

(22) Filed: Dec. 8, 2008

(65) Prior Publication Data

US 2010/0139903 A1 Jun. 10, 2010

(51) Int. Cl.
*F28F 1/10* (2006.01)
(52) U.S. Cl. ........ 165/177; 165/179; 165/184; 415/115; 416/96 R; 138/38
(58) Field of Classification Search ................ 416/96 R, 416/97 R; 415/115, 116, 178; 165/177, 165/179, 184, 133; 138/38
See application file for complete search history.

(56) References Cited

U.S. PATENT DOCUMENTS

| 3,423,069 | A | * | 1/1969 | Chandley | 416/92 |
| 4,668,269 | A | | 5/1987 | Cantu-Garcia et al. | |
| 4,669,957 | A | | 6/1987 | Phillips et al. | |
| 5,690,167 | A | * | 11/1997 | Rieger | 165/133 |
| 2003/0019614 | A1 | * | 1/2003 | Iwamoto et al. | 165/133 |
| 2005/0150648 | A1 | * | 7/2005 | Dilley et al. | 165/184 |
| 2007/0089868 | A1 | * | 4/2007 | Houfuku et al. | 165/133 |
| 2007/0109743 | A1 | | 5/2007 | Sugimoto et al. | |

* cited by examiner

*Primary Examiner* — Benny Lee
(74) *Attorney, Agent, or Firm* — Mark E. Henderson; Ernest G. Cusick; Frank A. Landgraff

(57) ABSTRACT

A hollow passage in a machine element for enhancing the heat exchanging properties between the machine element and a fluid flowing through the hollow passage; the hollow passage including a helicoidal groove. In some embodiments, the machine element comprises a heated machine element and the fluid comprises a coolant. In some embodiments, the machine element comprises a stator blade or a rotor blade of a gas turbine engine and the coolant comprises compressed air. In some embodiments, the helicoidal groove comprises a depression in an outer wall of the hollow passage that extends axially along the hollow passage to form a helicoidal or swirling path.

9 Claims, 2 Drawing Sheets

HEAT EXCHANGING HOLLOW PASSAGES WITH HELICOIDAL GROOVES

BACKGROUND OF THE INVENTION

This present application relates generally to apparatus, methods and/or systems for improving the heat exchanging or convective cooling characteristics within the hollow passages of machine parts or components. More specifically, but not by way of limitation, the present application relates to apparatus, methods and/or systems pertaining to convective cooling passages, especially as they might be used in the hot-gas path components of gas turbine engines. Note that, in part, the present invention will be described in relation to cooling the airfoils of rotary or gas turbine engines. This is exemplary only. As one of ordinary skill in the art will appreciate, the apparatus, methods, and/or systems described herein may be used more generally, for example, in any application where it is desired that heat be exchanged from a structure with a hollow passage to a working fluid that is flowing therethrough. Of course, as one of ordinary skill in the art will appreciate, there are many industrial applications that require heat exchange of this nature.

The airfoils of turbines, compressors, fans and the like, and particularly the rotor blades and stator blades of jet engines or gas turbine engines, generally are formed with internal hollow passages through which a cooling air is directed to convectively cool the internal walls of the passages. One prior art approach to increase the convective heat transfer between the cooling fluid and the internal walls of the blades has been to provide turbulence promoters within the internal cooling passages to interrupt the boundary layer growth of the cooling fluid adjacent the internal walls. By producing turbulent flow adjacent the internal wall surfaces, an improvement in heat transfer from these surfaces to the cooling fluid can be realized. Examples of turbulence promoters are disclosed in U.S. Pat. Nos. 4,627,480 and 5,704,763, the specifications of which are incorporated herein by reference.

Generally, the prior art in this technology area includes turbulence promoters that extend from the walls of the cooling passage into the flow field. One drawback associated with conventional turbulence promoters or turbulence generators is the creation of a large loss in the pressure of the cooling fluid as it passes over or through the turbulence generator baffles or ports defined within the cooling fluid passages. These large pressure drops may be compensated for by increasing the cooling fluid pressure and/or increasing the cooling fluid flow rates. This compensation, however, may detract from turbine engine performance and efficiency as the engine must provide additional bypass air that otherwise would be used for combustion. Moreover, this air dilutes the temperature of the gasses exiting the combustor and thus decreases the turbine rotor inlet temperature, which further reduces engine performance.

Accordingly, a need exists for a turbulence generator that avoids creating large pressure losses in the cooling fluid as it flows over wall surfaces being cooled. A need also exists for a coolant flowpath configuration which concentrates a flow of high velocity cooling fluid along localized portions of the flowpath wall surfaces so as to promote the creation of turbulent flow within the cooling fluid in order to disrupt boundary layer growth and enhance heat transfer.

SUMMARY OF THE INVENTION

The present application thus describes a hollow passage in a machine element for enhancing the heat exchanging properties between the machine element and a fluid flowing through the hollow passage; the hollow passage including a helicoidal groove. In some embodiments, the machine element comprises a heated machine element and the fluid comprises a coolant. In some embodiments, the machine element comprises a stator blade or a rotor blade of a gas turbine engine and the coolant comprises compressed air. In some embodiments, the helicoidal groove comprises a depression in an outer wall of the hollow passage that extends axially along the hollow passage to form a helicoidal or swirling path.

The present application further describes a method of enhancing the heat exchanging properties between a hollow passage in one of a rotor blade and stator blade in a gas turbine engine and a fluid flowing through the hollow passage; the method comprising the step providing the hollow passage with a helicoidal groove; wherein the helicoidal groove comprises a depression in an outer wall of the hollow passage that extends axially along the hollow passage to form a helicoidal or swirling path.

These and other features of the present application will become apparent upon review of the following detailed description of the preferred embodiments when taken in conjunction with the drawings and the appended claims.

BRIEF DESCRIPTION OF THE DRAWINGS

These and other objects and advantages of this invention will be more completely understood and appreciated by careful study of the following more detailed description of exemplary embodiments of the invention taken in conjunction with the accompanying drawings, in which.

DETAILED DESCRIPTION OF THE INVENTION

Figure 1:
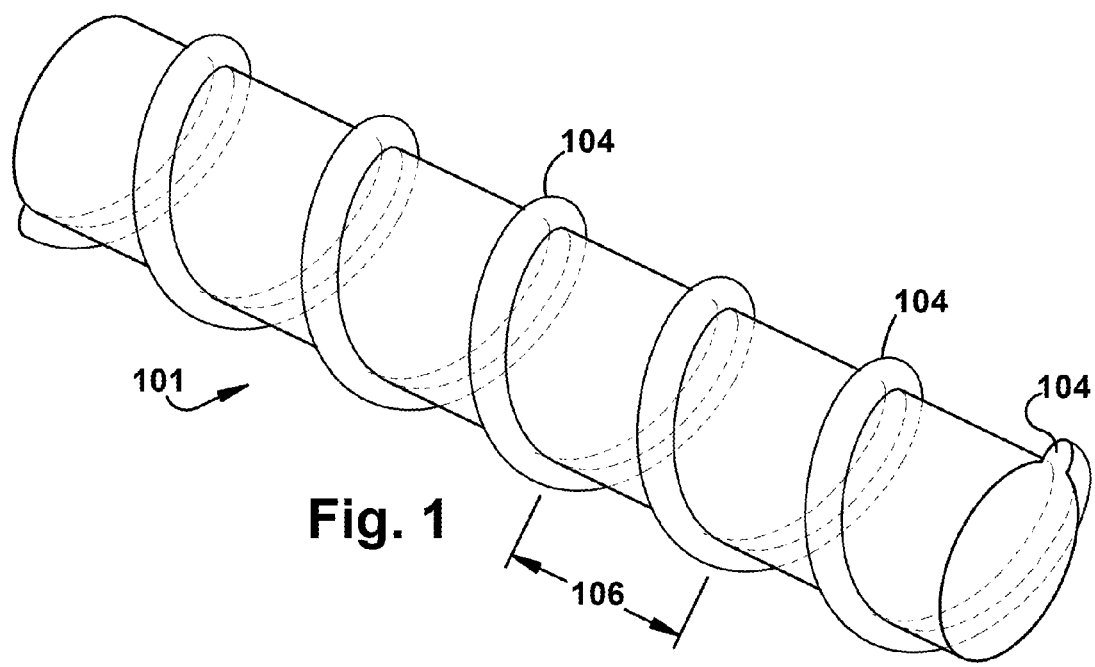
FIG. 1 is a perspective view of a hollow passage with a cooling of helicoidal groove according to an exemplary embodiment of the present application.
Figure 2:
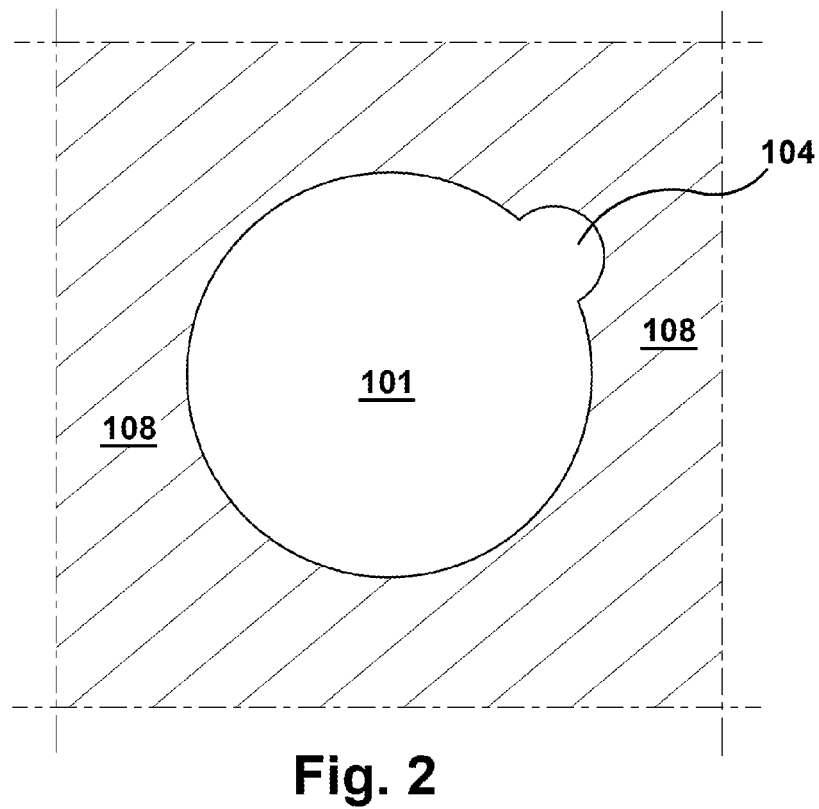
FIG. 2 is sectional view of the cooling groove of FIG. 1.

Referring now to the figures, FIG. 1 illustrates a perspective view of a hollow passage 101 with a heat exchanging or cooling groove (hereinafter "helicoidal groove 104") according to an exemplary embodiment of the present application. It will be appreciated that FIG. 1 illustrates the outer boundary of the hollow internal space of the passage 101. As shown in FIG. 2, the hollow passage 101 may be formed within a solid component or part 108, for example, in a rotor blade or a stator blade of a gas turbine engine, such that a coolant may be circulated therethrough. Of course, uses in other types of components or parts within gas turbine engines or other industrial machinery are possible. FIG. 2 illustrates a section view of the hollow passage 101 and the helicoidal groove 104. As stated, the hollow passage 101 generally is a hollow cavity that extends through the component 108. The component 108 often is a structure that requires the temperature moderation that can be achieved from circulating a coolant through the hollow passage 101 during operation. As one of ordinary skill in the art will appreciate, the helicoidal groove 104 described and claimed herein may be used in any heat exchanging application. For example, the helicoidal groove 104 may be used to dissipate heat from a surrounding structure or component to a coolant circulated through the hollow passage 101. Alternatively, the helicoidal groove 104 may be used to dissipate heat in a working fluid flowing through the hollow passage 101 to a surrounding structure or component. The present application will describe the use of the helicoidal groove 104 in relation to its use in the gas turbine industry, and, more specifically, its use to enhance cooling in the internal cooling passages, film cooling apertures, trailing edge slots and the like in rotor blades and stator blades in gas turbine engines. However, this description is merely exemplary and not intended to be limiting in any way.

Figure 5:
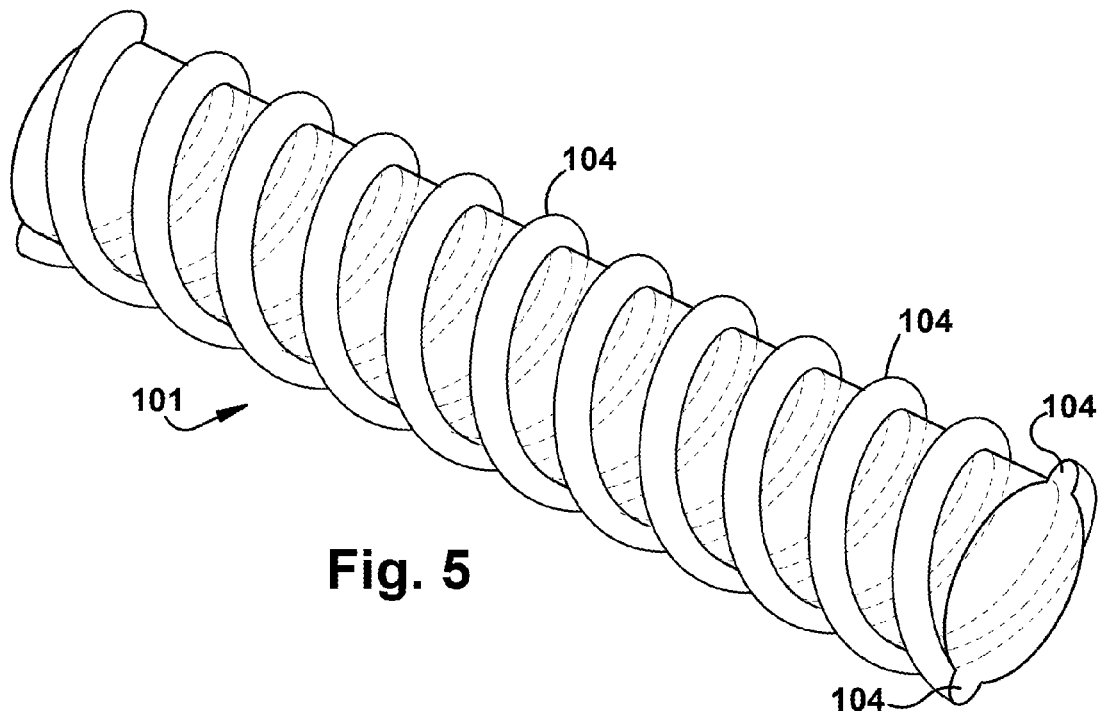
FIG. 5 is a perspective view of a pair of helicoidal grooves according to an alternative embodiment of the present application.

As illustrated in FIGS. 1, 2 and 5, the hollow passage 101 often has a circular cross-section. Formed in the outer wall of the cylindrical tube is a helicoidal groove 104 according to an exemplary embodiment of the present invention. As used herein, reference to the helicoidal groove 104, without further specification, is meant to have the broadest interpretation or meaning. That is, reference to a helicoidal groove is meant to broadly include any depression, groove, notch, trench, or similar formation that extends, whether continuously or intermittently, to form an approximate helicoidal or swirling path along a hollow passage. The helicoidal groove 104 illustrated in FIG. 1, for example, may be described as a continuous groove with a semi-circular profile that forms the shape of a helix as it extends along the hollow passage 101. The helicoidal groove 104 of FIG. 1, however, is exemplary only. As will be discussed in more detail below, helicoidal grooves according to the present invention may come in many shapes, sizes, and/or configurations. In addition, helicoidal grooves 104 according to the present invention may operate in hollow passages 101 of different configurations. Often, as previously mentioned, the hollow passage 101 will be circular in cross-section. This configuration is discussed primarily because of its prevalence in many industrial applications. However, helicoidal grooves 104 also can be employed in hollow passages that, for example, are rectangular, triangular, trapezoidal, or elliptical in cross-section.

Though other parameters may be used, in general, helicoidal grooves 104 may be described with the following four parameters: pitch; width; depth; and profile. In addition, as discussed in more detail below, helicoidal grooves 104 may be described as being uniform or non-uniform; continuous or intermittent; and whether the helicoidal groove 104 is a single groove or multiple. It is intended that the present application cover all of the potential iterations given these several parameters.

Pitch, which is represented in FIG. 1 as distance 106, is the axial length of the repeating pattern of the helicoidal groove 104. As stated, some helicoidal grooves 104 may be described as uniform, which as used herein is meant to convey that the helicoidal groove 104 forms a regular pattern that repeats itself at substantially regular intervals along its path within the hollow passage 101. Non-uniform helicoidal grooves (not shown) do not share this characteristic, and, thus, do not have constant pitch. For helicoidal grooves 104 that have an approximately constant pitch, it has been found that a wide range of pitch distances provide enhanced heat-exchanging characteristics to the hollow passage 101. Thus, while narrower preferred pitch ranges will be discussed, it is not intended that these be limiting in any way. It has also been found that pitch measurements that fall within a certain range are often uniquely advantageous for many typical applications. Because it is common for hollow passages to have circular cross-sections, it is possible to describe the pitch of a helicoidal groove by relating its length to the size of the circular cross-section. That is, a pitch may be described in terms of the ratio of pitch divided by diameter. Using this methodology, it has been discovered that a preferred ratio of pitch divided by diameter is between approximately 0.1 and 10.0.

Figure 3:
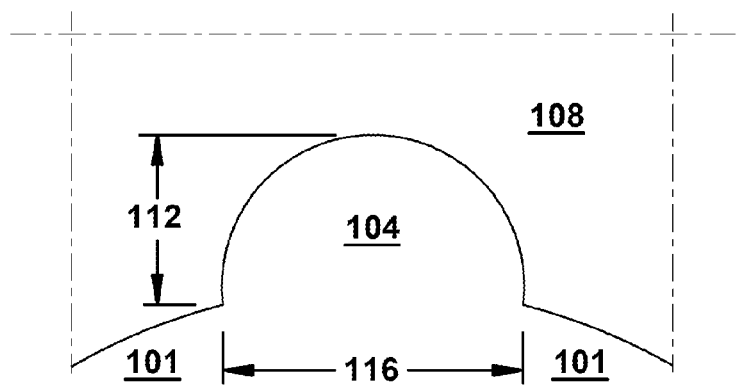
FIG. 3 is a sectional view of a cooling groove according to an exemplary embodiment of the present application.
Figure 4:
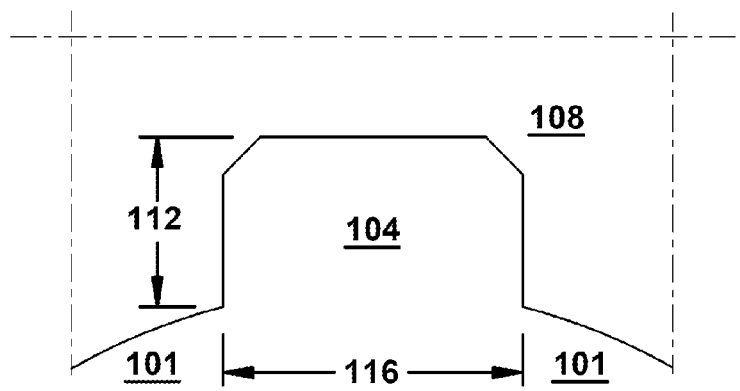
FIG. 4 is a sectional view of a cooling groove according to an alternative embodiment of the present application.

FIGS. 3 and 4 illustrate a more detailed cross-sectional view of two alternative embodiments of helicoidal grooves 104 in component 108 according to the present invention. In FIG. 3, the profile of the helicoidal groove 104 is semicircular. In such an embodiment, the depth of the helicoidal groove 104, which is indicated as distance 112, is the radial distance from the outer surface of the hollow passage 101 to the deepest part of the helicoidal groove 104. Of course, in the case where the profile of the helicoidal groove 104 is semicircular, the depth of the groove is essentially the radius of the circle. The width of the helicoidal groove 104 of FIG. 3, which is indicated as distance 116, is the circumferential distance from one side of the profile to the other. In the case where the profile of the helicoidal groove 104 is semicircular, the width of the groove is essentially the diameter of the circle.

In FIG. 4, the profile of the helicoidal groove 104 is rectangular. In such an embodiment, the depth of the helicoidal groove 104, which is indicated as distance 112, is the radial distance from the outer surface of the hollow passage 101 to the deepest part of the helicoidal groove 104. In this case, the depth is essentially the same as the radial length of the side walls. The width of the helicoidal groove 104 of FIG. 4, which is indicated as distance 116, is the circumferential distance from one side of the profile to the other. As one of ordinary skill in the art will appreciate, while FIGS. 3 and 4 illustrate some preferred profiles, other profile shapes are possible, such as a triangular, trapezoidal, semi-elliptical, "V" shaped, "U" shaped, and combinations of profiles and filet radii.

It has been found that helicoidal grooves 104 of a wide range of configurations, including wide ranges of depth and width measurements, provide enhanced heat exchanging characteristics and, thus, are intended to be covered by this application. However, it has also been found that depth and width parameters that fall within certain more narrow ranges are often uniquely advantageous for many typical applications. Because it is common for hollow passages to have circular cross-sections, it is again possible to describe the depth and width of a helicoidal groove by relating them to the size of the circular cross-section of the hollow passage. Thus, depth may be described in terms of the ratio of depth divided by diameter. And, width may be described in terms of the ratio of width divided by diameter. Using this methodology, it has been discovered that a preferred ratio of depth divided by diameter is between approximately 0.01 and 0.5. In addition, using this methodology, it has been discovered that a preferred ratio of width divided by diameter is between approximately 0.01 and 0.25.

As previously mentioned, helicoidal grooves 104 may also be described as being uniform or non-uniform. As used herein, a uniform helicoidal groove 104 is a groove that has a substantially constant pitch. A non-uniform helicoidal groove 104 does not have a constant pitch. In addition, helicoidal grooves 104 may also be either continuous or intermittent. As used herein, a continuous helicoidal groove 104 is one that forms a helicoidal path that extends around the hollow passage 101 at least one full turn, i.e. 360°, before terminating. Under this definition, the helicoidal groove 104 illustrated in FIG. 1 may be considered a continuous helicoidal groove 104. An intermittent helicoidal groove 104, on the other hand, is one that terminates and restarts at spaced intervals around the hollow passage 101 such that the groove fails to meet the above definition of a continuous helicoidal groove 104.

In addition, in certain embodiments, multiple helicoidal grooves 104 may be used in the same hollow passage 101. As illustrated in FIG. 5, two helicoidal grooves 104 may be formed such that they extend parallel to each other. It has been found that under certain circumstances, two helicoidal grooves 104 enhance the heat exchanging properties of the hollow passage 101. Additional helicoidal grooves 104 may also be used, as well as other configurations.

In use, the helicoidal groove 104 produces more effective and efficient convective heat transfer between the cooling fluid and the internal walls of the hollow passage. The helicoidal groove accomplishes this by promoting turbulent flow that generally interrupts boundary layer growth within the cooling fluid adjacent the internal walls. That is, by producing turbulent flow adjacent the internal wall surfaces, an improvement in heat transfer from these surfaces to the cooling fluid can be realized. The helicoidal groove induces a swirling effect in the cooling fluid that promotes mixing and brings colder fluid to passage wall, which increase the heat transfer between the cooling fluid and the passage wall. However, unlike conventional arrangements, the helicoidal groove does not extend from the walls of the cooling passage into the flow field and, thus, does not affect a significant loss in the pressure of the cooling fluid as it flows through the hollow passage. This means that less coolant may be used, which, as one of ordinary skill in the art will appreciate, generally means more efficient machines. For example, in the cooling of blades within gas turbine engine, large pressure drops are generally compensated for by increasing the cooling fluid pressure and/or increasing the cooling fluid flow rates. This compensation, however, detracts from turbine engine performance and efficiency as the engine must provide additional bypass air that otherwise would be used for combustion. Moreover, this air dilutes the temperature of the gasses exiting the combustor and thus decreases the turbine rotor inlet temperature, which further reduces engine performance.

From the above description of preferred embodiments of the invention, those skilled in the art will perceive improvements, changes and modifications. Such improvements, changes and modifications within the skill of the art are intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

I claim:

1. A hollow passage in a machine element for enhancing the heat exchanging properties between the machine element and a fluid flowing through the hollow passage; the hollow passage comprising a helicoidal groove;
   wherein the helicoidal groove includes an approximately constant pitch, wherein an approximately constant pitch means the helicoidal groove comprises a substantially uniform helicoidal pattern that repeats at substantially regular axial distances as the helicoidal groove extends around the hollow passage;
   wherein the hollow passage comprises a circular cross-section;
   wherein the ratio of the pitch of the helicoidal groove to the diameter of the circular cross-section is between approximately 0.1 and 10.0; and
   wherein the helicoidal groove comprises one of an approximate semicircular profile and an approximate rectangular profile.

2. The hollow passage according to claim 1, wherein the fluid comprises a coolant.

3. The hollow passage according to claim 1, wherein the helicoidal groove comprises an approximate U-shaped profile.

4. The hollow passage according to claim 1, wherein the hollow passage further comprises a plurality of helicoidal grooves that extend down the hollow passage in parallel relationship to each other.

5. The hollow passage according to claim 1, wherein the helicoidal groove comprises a depression in an outer wall of the hollow passage that extends axially along the hollow passage to form a helicoidal or swirling path.

6. The hollow passage according to claim 1, wherein:
   the helicoidal groove comprises a depth, which indicates the radial distance from an outer wall of the hollow passage to a deepest part of the helicoidal groove;
   the helicoidal groove comprises a width, which indicates the circumferential distance across the helicoidal groove;
   the ratio of the depth of the helicoidal groove to the diameter of the circular cross-section is between approximately 0.01 and 0.50; and
   the ratio of the width of the helicoidal groove to the diameter of the circular cross-section is between approximately 0.01 and 0.25.

7. The hollow passage according to claim 1, wherein:
   the helicoidal groove comprises a depth, which indicates the radial distance from an outer wall of the hollow passage to a deepest part of the helicoidal groove; and
   the helicoidal groove comprises a width, which indicates the circumferential distance across the helicoidal groove.

8. The hollow passage according to claim 7, wherein the ratio of the depth of the helicoidal groove to the diameter of the circular cross-section is between approximately 0.01 and 0.50.

9. The hollow passage according to claim 8, wherein the ratio of the width of the helicoidal groove to the diameter of the circular cross-section is between approximately 0.01 and 0.25.

* * * * *